Aug. 27, 1963
A. F. RODRIGUES ETAL
3,101,833
ORIENTING APPARATUS AND METHOD FOR ORIENTING WHOLE FRUIT
HAVING DEPRESSIONS AT THEIR STEM AND BLOSSOM ENDS
Filed May 3, 1961
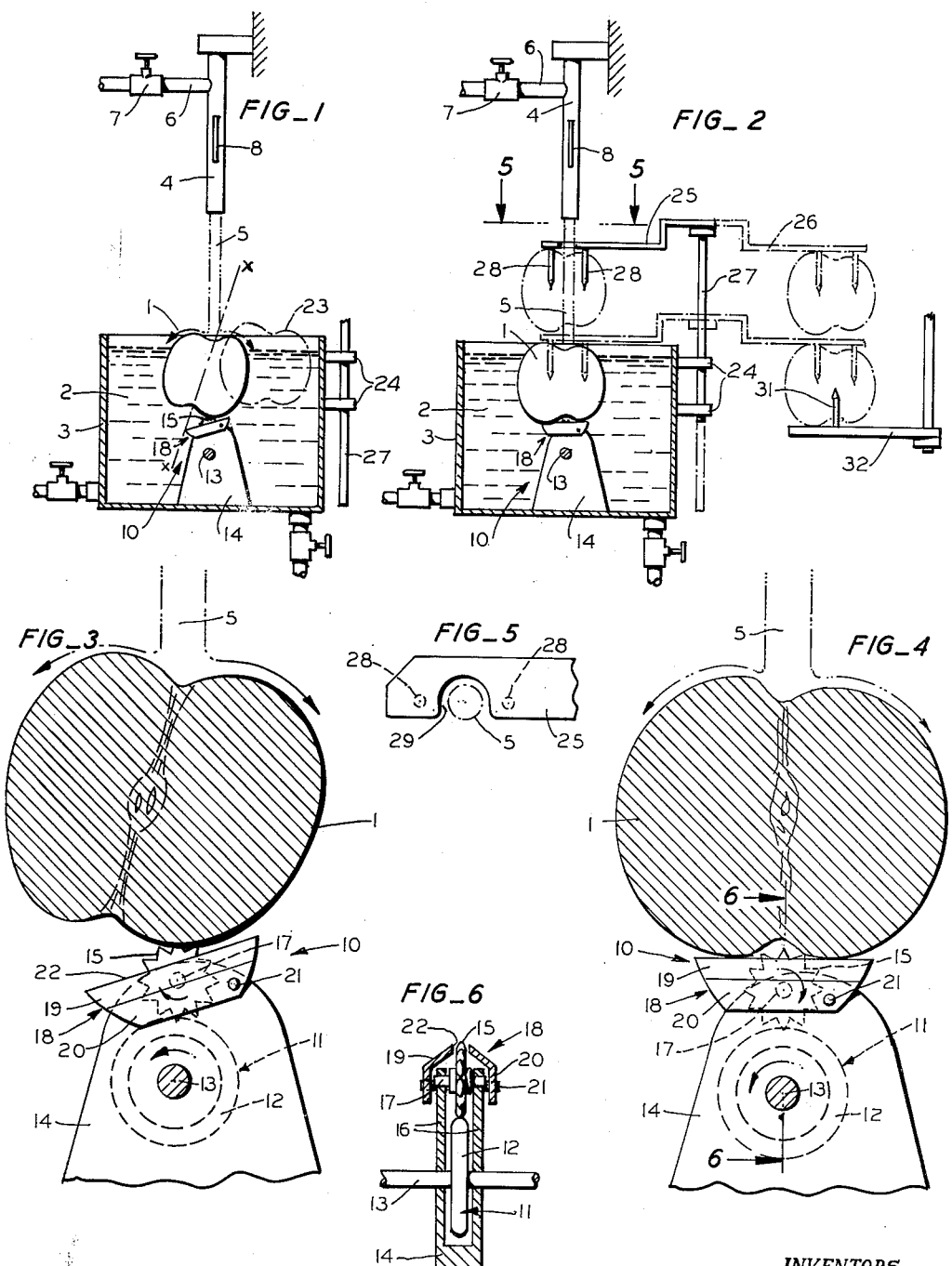
INVENTORS
ANTHONY F. RODRIGUES
EARL R. ANDERSON
BY
Boykin, Mohler & Wood
ATTORNEYS United States Patent Office 3,101,833
Patented Aug. 27, 1963

3,101,833
ORIENTING APPARATUS AND METHOD FOR ORIENTING WHOLE FRUIT HAVING DEPRESSIONS AT THEIR STEM AND BLOSSOM ENDS
Anthony F. Rodrigues, Los Gatos, and Earl R. Anderson, Campbell, Calif., assignors, by mesne assignments, to Filper Corporation, San Ramon, Calif.
Filed May 3, 1961, Ser. No. 107,451
13 Claims. (Cl. 198—33)

This invention relates to an orienting apparatus and to a method of orienting whole fruit units having depressions at their stem and blossom ends. Apples are an example of such units.

In the processing of apples for canning, dehydrating, etc., the apples are cored and peeled, and for many years these steps have been automatically performed by machinery.

The most common corer and peeler is known as a "Pease" corer and peeler, in which the apples are each peeled and cored, the coring being accomplished by a tubular cutter that is thrust through the apple, said cutter having cutting edges at one of its ends, and it is intended that the core be aligned with the longitudinal axis of the cutter so that it will be enclosed within the tube when cut from the apple and later discharged, leaving a clean open ended bore through the apple.

One of the main difficulties in coring apples with the above type of cutter, or with any core, is that there has heretofore been no provision of a means for accurately, efficiently and economically orienting apples of different sizes and shapes. Many apples are mis-shapen and unsymmetrical. Their stem-blossom axes are not their true axes.

The closest approach heretofore made toward orienting apples fed to a corer has been hand orienting, which is quite costly and inaccurate. Were an operator to take the necessary time to be truly accurate, the cost would be prohibitive.

It is, of course, obvious that the employment of clamps on the exterior of apples would be meaningless in orienting apples relative to their stem blossom axes, since such axes are not coaxial with the central axis of many apples, and it would be equally ineffective to merely orient one end of each apple since many apples are lopsided and the outer surface around the depression is not perpendicular to the blossom stem axis. The stem blossom axis of many apples would tilt relative to vertical were the apple supported on one of its ends on a horizontal surface, and there would be no uniformity in the test.

As a result of the present lack of an efficient method and apparatus for orienting apples relative to their stem-blossom axes, it is necessary to have operators at the discharge side of each corer and peeler to sort the apples that still have fragments or sections of the core therein and manually cut such sections out of the apples, which is a costly step.

One of the main objects of this invention is the provision of a highly efficient, fast, and accurate method of orienting apples so their stem-blossom axes are quickly located and held vertical in a uniform location to thereby enable the oriented apples to be transferred to a position in which their stem-blossom axes are accurately aligned with the axis of the corer.

Once the stem-blossom axes of apples are located on a predetermined axis in a predetermined position it is obvious that any further processing whereby the accurate determination of the stem-blossom axis is essential for accomplishing the desired results, will be relatively simple, whether the apples are to be transferred to a corer or elsewhere.

Another object of the invention is the provision of means for accomplishing the method above mentioned, which means is adapted to locate the stem-blossom axes of apples of any usual or unusual external contour and apples that may be deformed and unsymmetrical, and for positioning and holding all such apples with their stem-blossom axis in a uniform position at a predetermined location for transfer therefrom to another point, or for processing at such position if desired.

Other objects and advantages will appear in the description and in the drawings.

In the drawings, FIGS. 1, 2 are simplified views showing several steps in the method, and of apparatus adapted to perform such steps.

FIG. 3 is an enlarged view showing an apple in cross-sectional contour partially oriented and on an aligning element.

FIG. 4 is a view similar to that of FIG. 3, in which the apple has its stem-blossom axis oriented to vertical position.

FIG. 5 is a slightly enlarged fragmentary top plan view, taken along line 5—5 of FIG. 2 of a portion of a transfer device adapted to carry an oriented apple away from the position shown in FIGS. 2, 4.

FIG. 6 is a vertical sectional view taken along line 6—6 of FIG. 4.

In detail, referring to FIG. 1, the apples may be fed successively into a body of water 2 in a tank or receptacle 3 that has an open upper side.

Spaced above said body of water 2 is a downwardly directed discharge nozzle 4 that is adapted to discharge a vertical laminar stream 5 of water downwardly into said body. This nozzle may be connected by a conduit 6 with any suitable source of water, such as a city main or the like where the pressure is fairly uniform. A valve 7 of any suitable type may be in said conduit to regulate the flow of water. Normally a pair of elongated cross blades 8, extending longitudinally of the nozzle and within the latter position at right angles to each other, is adequate to produce a laminar stream 5.

The lower end of the nozzle 4 is preferably positioned above the upper level of said body 2 a distance greater than the maximum vertical dimension of apples that are oriented.

Submerged within body 2 on a downward extension of the vertical axis of the stream 5 is an orienting device generally designated 10. This device comprises a wheel 11 (FIG. 3) having a relatively soft tire 12 or rim thereon of rubber or rubber-like material, which wheel is secured on a horizontal shaft 13 that is journalled for rotation in a bracket or support 14 that is rigidly secured to the receptacle in any suitable manner.

Shaft 13 rotatably extends through a wall of receptacle 3 to the outside, where it is connected with a source of power, such as a motor, for rotating it in the direction of the arrow seen in FIG. 3.

Above wheel 11 is a second wheel 15, or disc, having radially outwardly directed points thereon that are adapted to be engaged by the tire of wheel 11 for being driven by wheel 11 when the latter is rotated. The bracket 14 extends upwardly at its upper end in generally the form of a clevis, so both wheel 11 and wheel 15 are supplied between the pair of arms 16 of the clevis (FIG. 6) and wheel 15 is rotatably supported on a shaft 17 (FIG. 6) that terminates at the outer sides of the said arms.

A hood in the form of a horizontally elongated gable-like member 18, having downwardly divergently extending top walls 19 and depending opposed side walls 20 is positioned in the upper ends of arms 16 and said member is supported on said arms by coaxial pivots 21 that are offset a substantial distance to one side of and below the shaft 17.

The hood 18 is slotted at 22 (FIG. 6) longitudinally thereof along its ridge to enable the wheel to project from the hood when, by gravity, the end of the hood at the side of shaft 17 that is opposite to pivot 21 is depressed, as seen in FIGS. 1, 3. However, when the ridge of the hood is substantially level, the wheel 15 is substantially concealed, and little, if any, of the points on the wheel protrude upwardly.

Referring to FIG. 1, assume the stream 5 is flowing and wheel 15 is rotating and an apple is dropped into the water 2 in a position 23 indicated in dotted lines. This apple may be quite mis-shapen so that its stem-blossom axis is offset to one side or the other of a butt axis extending through the center of gravity of the apple, and the blossom stem axis may be tilted relative to said true axis, as indicated by the line x—x in FIG. 1.

The currents induced in the body of water 2 will quickly cause the apple to be floated under the stream 5, and to a position spaced above the wheel 15, and will be in the position indicated in full line in FIG. 1 which numeral denotes the actual apple 1. When under the stream, it will be rotated and agitated by the latter so that the depression in the apple at the stem and/or at the blossom end will be directly under the stream and on the longitudinal axis of the stream, and when this occurs, the apple is forcefully held in said position by the stream and the latter forces the apple downwardly against the wheel 15. This wheel rapidly agitates and moves the lower end of the apple to a position in which the wheel enters the depression that is opposite to the upper depression that is held on the vertical axis of the stream 5.

Since the wheel 15 is on the axis of the stream, when it enters the lower depression in the apple, said lower depression is also on the vertical axis of stream 5, and the stem blossom axis of the apple is coaxial with said axis of stream 5.

Immediately, upon the wheel 15 entering the depression, the hood 18 will be pivoted on the pivots 21 to swing the hood upwardly, and this will elevate the apple relative to the wheel 15 so it will be out of the influence of the latter and will be held stationary on the hood by the stream 5. It is immaterial whether the blossom depression or the stem depression is uppermost or lowermost, the apple will be quickly oriented so its stem-blossom axis is coaxial with the longitudinal axis of the stream 5, and is vertical.

Should the stem end be lowermost, and should it have a protruding stem, the latter will be guided to one side or the other of the gable top of the hood 18, and it will not interfere with the accuracy of the orienting step. Should the stem project upwardly when the stem end is uppermost, the accuracy of the orienting step will not be affected.

Once the apple is oriented, as above described, an arm 25 (FIG. 2) that normally may be in dot-dash line position 26 projecting away from the tank, may be swung over the tank and over apple 1 that is being held in the tank 2 in its oriented position.

This arm may be secured at one end to a vertical rod 27 that is rotatable and vertically reciprocable in bearings 24 carried by the tank, and the outer end of arm 25 is provided with a pair of downwardly extending impaling prongs 28 at opposite sides of a laterally opening recess 29 formed in said arm. (FIG. 5).

When the arm is swung over the apple, as seen in FIG. 2, the stream 5 will pass through recess so the arm will not interfere with the stream, and said arm may then be moved downwardly so the prongs 28 will securely impale the apple at its upper end, the lower end of the apple being supported on the orienting device 10.

After the apple is impaled, the arm 25 may be elevated and swung back to position 26 carrying the apple with it. The arm may then be lowered so that the vertical stem-blossom axis of the apple is coaxial with an upwardly projecting spike 31 of the corer, which spike may be carried on any suitable means, such as an arm 32, for carrying the apple beneath a coring cutter.

The apple will, of course, be stripped from prongs 28 when the arm 25 moves back to position 26, and the apple will have its stem-blossom axis coaxial with spike 31.

It is believed clear from the above explanation that the orienting step in tank 3 provides an accurate and fast method and means of orienting the apple.

This method can be said to be one in which each apple is floatingly supported in a body of liquid, of which water is an example for the present purpose, and the apple is floated below a vertically downwardly directed stream of water. This stream not only agitates and turns the apple, but it holds the apple therebelow with the uppermost depression, either at the blossom or stem end, on the vertical axis of the stream. The lower end of the apple carrying the other depression is then agitated and moved around until it is on the axis of the stream and at that moment the apple is held with its stem-blossom axis coaxial with the axis of the stream until it is removed therefrom.

In the present example, the oriented apple is impaled while its stem-blossom axis is vertical to prevent any shifting of said axis relative to the impaler while being transferred to another impaler at a predetermined point and which other impaler may locate the apple in a position in which said stem-blossom axis is coaxial with the corer.

In connection with the orienting apparatus, the stream 5 is adapted to function even when the apple is submerged for a substantial distance below the water level, as may occur with small apples.

The mechanism 10 that includes the hood 18, forms a substantially rigid support during the impaling of the apples, and the water level in tank 3 may be easily regulated by any suitable valved inlet and outlet.

In the present disclosure, no attempt is made to show more than a basic apparatus adapted to carry out the method.

Orienting wheels, in themselves, have long been employed in orienting peaches, cherries and the like; however, in the present combination, it should be noted that, in the event an uppermost recess in an apple is not immediately oriented by the stream 5, it will be forced down under the influence of the stream against the rotating wheel 15, and the stream and wheel 15 will coact to bring the two depressions into axial alignment with the stream axis. Usually, however, the stream acts first, since the apple will quickly rotate to bring the uppermost depression on the stream axis as soon as the apple is moved to a point in the relatively close vicinity of the depression. Also, apples normally float with the stem end uppermost, and if not, then the blossom end may be uppermost.

It has already been mentioned that the body 1 may be of any liquid in which an apple or fruit unit may float, and also, it should be mentioned that the jet alone may be used for orienting fruit bodies having only one indent, in which case the fruit is oriented relative to the one indent rather than with respect to indents at generally opposite sides of the bodies.

The appended claims are intended to cover all changes and modifications of the example of the invention herein chosen for the purpose of the disclosure, which do not constitute departures from the spirit and scope of the invention.

We claim:

1. The method of orienting a generally spherical buoyant fruit unit having a pair of depressions in its outer surface respectively at its stem and blossom ends, so that the stem-blossom axis on which said depressions are located is vertical, comprising the steps of ejecting a solid stream of liquid vertically downwardly into a body of liquid from a point spaced above the upper level of said body thereby inducing the surface layer of said liquid to flow to said stream at its point of engagement with said body; floating such unit in said body within the influence of the liquid flowing to said point to carry said unit to below and within said stream and to a position in which one depression of said pair thereof is uppermost and substantially coaxial with the vertical axis of said stream, then yieldably holding said one depression substantially on said vertical axis and at the same time moving the lower portion of said unit in which the other depression of said pair is positioned to a position in which said other depression is coaxial with said axis, and then holding said unit stationary for subsequent removal with its stem-blossom axis vertical.

2. The method of orienting a generally spherical buoyant fruit unit having a pair of depressions in its outer surface respectively at its stem and blossom ends, so that the stem-blossom axis on which said depressions are located is vertical, comprising the steps of ejecting a solid stream of liquid vertically downwardly into a body of liquid from a point spaced above the upper level of said body thereby inducing the surface layer of said liquid to flow to said stream at its point of engagement with said body; floating such unit in said body within the influence of the liquid flowing to said point to carry said unit to below and within said stream and to a position in which one depression of said pair thereof is uppermost and substantially coaxial with the vertical axis of said stream, then yieldably holding said one depression substantially on said vertical axis and at the same time moving the lower portion of said unit in which the other depression of said pair is positioned to a position in which said other depression is coaxial with said axis, and then holding said unit stationary for subsequent removal with its stem-blossom axis vertical, then moving said unit from said body and stream and transferring it to a predetermined location from said body with its said stem-blossom axis vertical and extending through a fixed predetermined point at said location.

3. The method of orienting a generally spherical buoyant fruit unit having a pair of depressions in its outer surface respectively at its stem and blossom ends, so that the stem-blossom axis on which said depressions are located is vertical, comprising the steps of; floatingly supporting said unit within a body of liquid, and continuously agitating and moving said unit by and within the liquid of a descending, vertical, laminar stream thereof until one depression of said pair is uppermost and substantially on the vertical axis of said stream, depressing said unit within said body under the influence of said stream while holding said one depression on said axis and moving the lower portion of said unit transversely of said axis to a position in which said other depression is on said vertical axis, and then holdng said depressions coaxial with said vertical axis under the influence of said stream.

4. The method of orienting generally spherical, buoyant, fruit units, such as apples, that have depressions at their stem and blossom ends on a stem-blossom axis, so said axis is vertical, that comprises the steps of; floating each unit within a body of water, dicharging a vertically directed, laminar stream downwardly into said body from a point spaced above said body and unit and into engagement with said unit to depress said unit downwardly into said body and to rotate the former by said stream until one depression of said pair is uppermost and on the vertical axis of said stream; then holding said one depression substantially on said axis and within said stream under the influence of the latter and moving the lower portion of said unit laterally until the other depression is on said axis.

5. The method of orienting an apple so its stem-blossom axis is vertical that includes the steps of; holding said apple within a body of water at a level below the normal floating level of said apple in said body between a submerged support at a fixed level and a descending vertical laminar stream of water, coaxial with said support, moving said apple within the water of said stream while so held until said stem-blossom axis is coaxial with the vertical axis of said stream and then holding said apple against movement of its said stem-blossom axis for subsequent removal of said apple from said body of water.

6. The method of orienting an apple so its stem-blossom axis is vertical that includes the steps of; holding said apple within a body of water at a level below the normal floating level of said apple in said body between a submerged support at a fixed level and a descending vertical laminar stream of water that is coaxial with said support solely under the influence of the water of said stream; moving said apple within said body within the water of said stream while it is so held between said stream and said support until said stem-blossom axis is coaxial with the vertical axis of said stream and immediately upon said stem-blossom axis being coaxial with the axis of said stream, elevating said apple off said support and holding it against movement of its said stem blossom axis out of coaxial relation with said vertical axis of said stream for subsequent removal from said body and stream.

7. Apparatus for orienting a whole fruit unit, such as an apple, that has stem and blossom ends and a pair of outwardly facing depressions at said ends on a stem-blossom axis, comprising the combination of; means containing a body of water; upper and lower vertically spaced orienting means between which a fruit unit is adapted to be floated in said body, said upper means comprising a conduit for water having a downwardly directed discharge nozzle adapted to eject a laminar stream vertically downwardly for engaging such apple when the latter is floated therebelow to enter one depression in said unit for holding said one depression substantially on the vertical axis of said stream and said lower means being a movable element adapted to engage the underside of such unit when it is so held in said stream for moving the other depression in said unit to a position on said vertical axis, means connected with said movable element for so moving it.

8. Apparatus for orienting a whole fruit unit, such as an apple, that has stem and blossom ends and a pair of outwardly facing depressions at said ends on a stem-blossom axis, comprising the combination of; means containing a body of water; upper and lower vertically spaced orienting means between which a fruit unit is adapted to be floated in said body; said upper means comprising a conduit for water having a downwardly directed discharge nozzle adapted to eject a laminar stream vertically downwardly for engaging such apple when the latter is floated therebelow to enter one depression in said unit for holding said one depression substantially on the vertical axis of said stream and said lower means being a movable element adapted to engage the underside of such unit when it is so held in said stream for moving the other depression in said unit to a position on said vertical axis, means connected with said movable element for so moving it, and movable means supported for movement to a position holding said unit with its blossom stem axis vertical upon said movement of said other depression to said vertical axis, and means supporting said last-mentioned movable means for said movement thereof.

9. Apparatus for orienting a whole fruit unit, such as an apple, that has stem and blossom ends and a pair of outwardly facing depressions at said ends on a stem-blossom axis, comprising the combination of; means containing a body of water; upper and lower vertically spaced orienting means between which a fruit unit is adapted to be floated in said body, said upper means comprising a conduit for water having a downwardly directed discharge nozzle adapted to eject a laminar stream vertically downwardly for engaging such apple when the latter is floated therebelow to enter one depression in said unit for holding said one depression substantially on the vertical axis of said stream and said lower means being a movable element adapted to engage the underside of such unit when it is so held in said stream for moving the other depression in said unit to a position on said vertical axis, means connected with said movable element for so moving it, and movable means supported for movement to a position holding said unit with its blossom stem axis vertical upon said movement of said other depression to said vertical axis, and means supporting said last-mentioned movable means for said movement thereof; said last-mentioned movable means being actuatable for said movement under the influence of said unit.

10. Apparatus for orienting a whole fruit unit, such as an apple having a pair of outwardly opening stem and blossom depressions at its stem and blossom ends and on its stem-blossom axis, comprising; a container having a body of water therein in which such unit is adapted to float; a downwardly directed nozzle spaced above the upper level of said body adapted to discharge a vertical laminar stream downwardly into said body for entering one depression of said pair when such unit is within such stream and for holding said one depression on the vertical axis of said stream; a rotary element submerged within said body on said vertical axis adapted to engage the underside of a unit so held in said stream for moving said underside to a position in which said element will enter the other depression of said pair, supporting means supporting said element so submerged and means connected with said element for rotating it; means pivotally supported on said supporting means in a position for engagement with said unit when the latter is in a position in which said element is in said other depression and actuatable by said unit upon such engagement for elevating said unit out of engagement with said element and for holding said lower depression on said vertical axis.

11. The method of orienting a generally spherical fruit so that its stem-blossom axis is located and includes the steps of positioning a fruit in a body of water, impacting the fruit with a solid laminar stream of liquid, moving the fruit until a cavity encounters the stream to effect orientation of the fruit with the stem-blossom axis in alignment with said stream and to maintain thereafter such orientation, and thereafter applying a lifting effect to the end of the fruit opposite the stream-impacted cavity in a direction toward the stream so as to maintain the alignment of the stem-blossom axis as the fruit is lifted from the body of water.

12. The method of orienting a generally spherical fruit body having an outwardly opening depression at one end of its stem blossom axis so that said one end is located, that includes the steps of: floatingly supporting said body in a liquid, impacting said body with a solid, downwardly directed laminar stream of liquid, moving said body within said stream until said stream enters said depression whereby said body will thereafter be held with said depression substantially in alignment with the vertical axis of said stream.

13. The method of orienting a generally spherical fruit body having an outwardly opening depression at one end of its stem blossom axis, so that said one end is located, that includes the steps of: floatingly supporting said body in a liquid, impacting said body with a vertically downwardly directed laminar stream of liquid, moving said body within said stream until said depression is uppermost and receives said stream, then holding said body stationary with said depression substantially coaxial with the vertical stream.

References Cited in the file of this patent
UNITED STATES PATENTS
2,901,087    Cox ------------------ Aug. 25, 1959